2 Sheets—Sheet 1.

A. J. MANNY.
HUB FOR ROTARY COLTERS.

No. 244,362.　　　　　　　Patented July 12, 1881.

Attest:
Walter Allen
Walter E. Guy

Inventor
Abraham J. Manny
By Knight Bros
Attorneys

2 Sheets—Sheet 2.

A. J. MANNY.
HUB FOR ROTARY COLTERS.

No. 244,362. Patented July 12, 1881.

Attest:
Walter Allen
Walter E. Guy

Inventor:
Abraham J. Manny
By Knight Bros
Attorneys

United States Patent Office.

ABRAHAM J. MANNY, OF ST. LOUIS, MISSOURI.

HUB FOR ROTARY COLTERS.

SPECIFICATION forming part of Letters Patent No. 244,362, dated July 12, 1881.

Application filed June 12, 1879.

*To all whom it may concern:*

Be it known that I, ABRAHAM J. MANNY, of the city of St. Louis, in the State of Missouri, have invented a certain new and useful Improvement in Hubs for Rotary Colters, of which the following is a full, clear, and exact description, reference being had to the accompanying drawings, forming part of this specification.

My improvement relates to a hub having a hollow central bolt extending through its entire length, and between the head and nut of which the colter-blade is clamped securely.

The first part of my improvement consists in the construction of the hollow central bolt, the face of each of the outer ends of which forms a bearing against the inner side of the lower end of each leg of the yoke, and the length of which bolt is unvarying, whatever change may be made in the thickness of the colter-blade as may be required in proportion to its diameter and special use. The importance of this improvement will be manifest when it is considered that in the devices heretofore used, and in which the distance between the ends of the hub varied with each different thickness of blade upon which they were used, a separate pattern of each hub or yoke was rendered necessary for each, or without which change in pattern the hub would be expanded in length and bind in the yoke when a thicker blade was used, or the use of a thinner blade would contract the hub in length and leave an opening between the faces of its ends and the inner faces of the lower ends of the legs of the yoke, into which opening the dust and dirt would be constantly falling, and, working into the bearing, would rapidly wear it out.

The second part of my improvement consists in clamping the colter-blade firmly between two separate loose disks by the hollow central bolt and nut. The construction is such that the disks being made with their inner faces concave or chambered, with a peripheral bearing-rim at the outer edge of each, and being made separate from and loose upon the hollow central bolt, accommodate themselves to any irregularities in the form or shape of the bolt or blade. The blade is thus clamped so firmly as to prevent any vibration, and the head and nut of the hollow central bolt not holding the blade between them by direct contact, but through the interposed disks, are not liable to jar or work loose.

Figure 1:
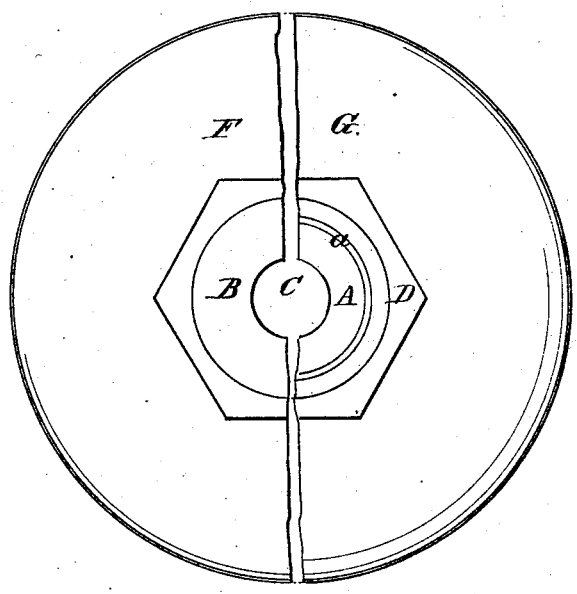
Figure 2:
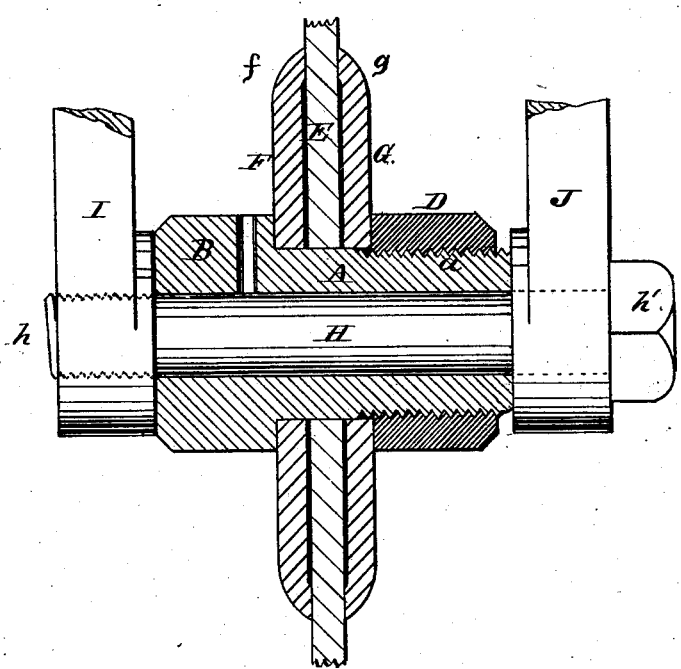

In the drawings, Figure 1 shows two one-half end views of the opposite ends of the hub, respectively. Fig. 2 shows the hub in axial section, with the lower ends of the yoke and the bolt on which it has journal-bearing in side view.

The inner member of the hub consists of the hollow bolt or stem A, having a head, B, and through which axial hole C extends. The stem or bolt A is screw-threaded at $a$. D is a nut screwing upon thread $a$. The colter-blade E is held between the nut D and the head B, but not by direct contact with the nut and head, but through the interposed disks F and G. The disks F and G are of similar form and fit loose upon the stem A, so that they can accommodate themselves to any slight irregularities in the face of the nut or head, and so have an even bearing against the sides of the colter-blade by means of the marginal rims $f$ and $g$. This capacity for accommodation is rendered necessary from the fact that the parts of the hub are finished in casting, and are liable to some slight malformation or excrescences that may prevent a perfect bearing upon the blade when the disks are in one piece with or rigidly attached to the head and nut, or when they are made in any manner to form a portion or all of the bearing for the axle or arbor bolt, so that they cannot accommodate themselves to suit the irregularities, and the consequence is an imperfect bearing, allowing the colter-blade to vibrate and the parts of the hub to jar and work loose.

H is an arbor upon which the hub turns. This arbor extends through the legs I and J of the yoke, and has head $h'$ and screw-threaded end $h$.

It will be seen that the central part, A, of the hub extends from leg I to leg J, against which it has end bearing, so that the bearing is unaffected by the position of the nut D. This is practically important, because the thickness of the colter-blades varies according to their diameter and the kind of work they are to perform; and where one of the end bearings is against the end of nut or part D the length of the hub will vary with the variation in thickness of the colter-blade.

I claim as my invention—

1. The combination, in a rotary colter, of the yoke I J, arbor H, and hub A, rotating thereon and bearing against the yoke-arms I J, with the angular collar B, saucer-shaped disks F G, colter-blade E, and nut D, said nut being screwed onto the hub A and forming no part of the bearing-surface thereof, as shown and set forth.

2. The hub for rotary colters having the bearing part A B, with an angular head upon its one end, and extending the entire distance between the legs I and J of the yoke, and each of the outer ends of which forms a face bearing against the inner side of the lower end of each leg of the yoke, the same having the screw-thread $a$ of greater length than the thickness of the nut D, and upon which the nut D screws to clamp the colter-blade, substantially as and for the purpose set forth.

3. The rotary colter herein described, consisting of the disks E, the angular-headed hollow bolt A B, with a cylindrical bore, adapting it for continuous bearing on a fixed mandrel, the nut D, working on said hollow bolt, and the saucer-shaped disks F G, clamped between the head B and the nut D and griping the disk E by their peripheries, as and for the purposes set forth.

4. In a rotary colter, the combination, with yoke I J and central bearing-bolt, H, of the hollow clamp-bolt A, having angular head B and external nut, D, and bearing at its ends against the cheeks of the yoke I J, as herein shown and described.

5. The combination, with the yoke I J, central bolt, H, and colter-blade E, of the hollow clamp-bolt A, having angular head B and external nut, D, and the saucer-shaped disks F G, slipped loosely on the hollow bolt A and clamped between head B and nut D, as explained.

6. In a rotary colter, the combination, with the yoke I J and cylindrical bearing-bolt H, of the hollow clamp-bolt A B, extending from cheek to cheek of the yoke I J, and having a continuous bearing on the bolt H, as shown.

ABRAHAM J. MANNY.

Witnesses:
  GEO. H. KNIGHT,
  C. W. H. BROWN.